Figure 1:
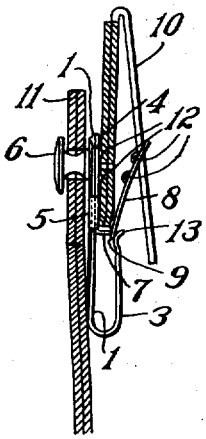

W. CONWAY.

CLASP.

APPLICATION FILED JULY 6, 1915.

Reissued Oct. 26, 1915.

14,001.

WITNESSES

Anna B. Lindsay

Frances M. Hurley

INVENTOR

WILLIAM CONWAY

BY

Mitchell, Chadwick & Kent

ATTYS.

COLUMBIA PLANOGRAPH CO., WASHINGTON, D. C.

UNITED STATES PATENT OFFICE.

WILLIAM CONWAY, OF SOUTH BOSTON, MASSACHUSETTS.

CLASP.

14,001. Specification of Reissued Letters Patent. Reissued Oct. 26, 1915.

Original No. 1,080,539, dated December 9, 1913, Serial No. 720,823. Application for reissue filed July 6, 1915. Serial No. 38,365.

*To all whom it may concern:*

Be it known that I, WILLIAM CONWAY, a citizen of the United States, formerly residing at Montclair Heights, in the county of Essex and State of New Jersey, and now residing at South Boston, in the State of Massachusetts, have invented an Improvement in Clasps, of which the following description, in connection with the accompanying drawing, is a specification, like characters on the drawing representing like parts.

My invention relates to a clasp designed more particularly for use as a collar fastener, and is intended to take the place of the usual stud in the front buttonhole of a shirt neckband.

The invention will be understood by reference to the accompanying drawing, in which:—

Figure 2:
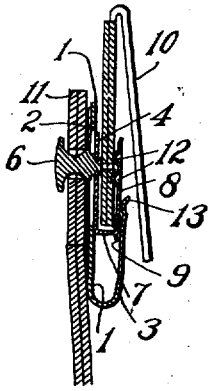
Figure 3:
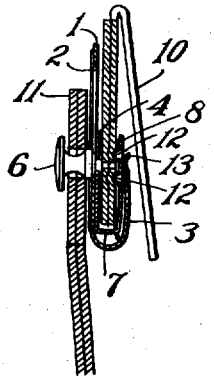
Figure 5:
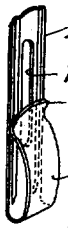
Figure 4:
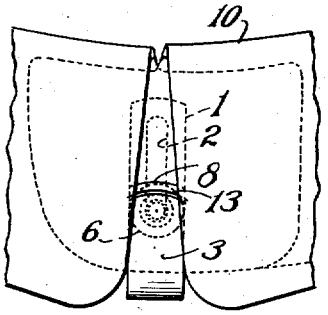
Figure 6:
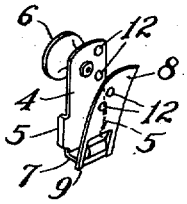

Figure 1 is a side elevation of my device with the parts in open position, the collar end and a portion of the shirt being in section; Fig. 2 is a vertical section, the parts of the device in position when being closed; Fig. 3 is a similar view with the parts closed; Fig. 4 is a front view of a portion of a collar with the device in position holding the collar in place; and Figs. 5 and 6, perspective views of the two parts of the device.

Similar reference numerals indicate similar parts in the several views.

The device is made of metal, preferably thin spring steel, and consists of a substantially U-shaped member having a plate 1 with a longitudinal slot 2, and a turned-up spring tongue 3, said member embracing and being slidably mounted upon a similarly shaped stationary member having clamping jaws and held by a button in the buttonhole of the neck band of a shirt. The part which receives the ends to be clamped together comprises a base 4 having guide lugs 5, and a stud button 6. The plate 1 of the movable member is adapted to slide over the back of the base 4 between the lugs 5, the stud button 6 projecting through the slot 2 in the said plate and adapted to be inserted and held in the buttonhole of the shirt neck band. At its lower end the base or fixed jaw 4 is formed with an angular part 7 to which is hinged a plate 8, constituting the movable jaw of the clamp, the latter having an extension 9 projecting below the hinge.

When the collar 10 is to be fastened in place, the device is arranged with the stud 6 in the buttonhole of the shirt neck band 11 and with the parts in the position shown in Fig. 1. The free ends of the collar are inserted between the plate or hinged jaw 8 and the base or fixed jaw 4. The clasp is then closed by pressing against the lower end of the spring tongue 3, causing the parts to first assume the position shown in Fig. 2, and finally that shown in Fig. 3, in which the spring tongue 3 forces the plate 8 toward the base 4 to hold the ends of the collar securely between said plate and base. The plate and the base are provided with prongs 12 to prevent slipping of the collar ends. When the collar is to be released, the wearer merely pulls down on the finger piece 13 at the end of the tongue 3 so that the plate 1 is pulled down relative to the base 4 and plate 8, until the end of the spring tongue 3 strikes the projection 9 on the clamping plate 8, which will result in the clamping plate being thrown outward to the position shown in Fig. 1, and the collar ends thereby released.

With this device the usual buttonholes in the collar ends are not used. The object is to clamp the collar in the desired position, or in a position to fit properly, without it being necessary to pull the collar together by tightening up the neck-tie when the latter is tied.

Although I have described my invention as designed more particularly for use as a collar fastener it is to be understood that it is capable of use in other connections and for other purposes.

What I claim and desire to secure by Letters Patent of the United States is:—

1. A device of the character described comprising a base having a stud button secured thereto, a clamping jaw hinged on said base, and a member embracing said base and jaw and slidably mounted on said base, said member having a spring tongue bearing against said jaw to positively close and open it when said member is moved.

2. A device of the character described comprising a base having a stud secured thereto, a clamping jaw hinged on said base, and a movable member comprising a plate having a slot through which said stud projects, and a spring tongue bent upward from said slotted plate and bearing against said clamping jaw to positively close and open it when said member is moved.

3. A device of the character described comprising a base having a stud secured thereto, a clamping jaw hinged on said base, said jaw having an extension below the hinge, and a member embracing said base and jaw and slidably mounted on said base, said member having a spring tongue bearing against said jaw to positively close and open it when said member is moved.

4. A device of the character described comprising a base having a stud secured thereto, a clamping jaw hinged on said base, and a member embracing said base and jaw and slidably mounted on said base, said member having a spring tongue bearing against said jaw to positively close and open it when said member is moved.

In testimony that I claim the foregoing as my invention, I have signed my name in the presence of two witnesses this 25th day of June, 1915.

WILLIAM CONWAY.

Witnesses:
EVERETT E. KENT,
MARY A. NYHAN.

Copies of this patent may be obtained for five cents each, by addressing the "Commissioner of Patents. Washington, D. C."